United States Patent

Duca et al.

[11] Patent Number: 6,011,705
[45] Date of Patent: Jan. 4, 2000

[54] ELECTRIC CIRCUIT FOR REDUCING HARMONIC CURRENTS

[75] Inventors: Christian Duca, Buckenhof; Marcus Weber, Forchheim, both of Germany

[73] Assignee: Siemens Aktiengesellschaft, München, Germany

[21] Appl. No.: 08/913,539

[22] PCT Filed: Mar. 4, 1996

[86] PCT No.: PCT/DE96/00377

§ 371 Date: Dec. 8, 1997

§ 102(e) Date: Dec. 8, 1997

[87] PCT Pub. No.: WO96/28876

PCT Pub. Date: Sep. 19, 1996

[30] Foreign Application Priority Data

Mar. 15, 1995 [DE] Germany ............ 195 09 329

[51] Int. Cl.[7] ............................................. H02M 1/12
[52] U.S. Cl. .......................................... 363/39; 363/47
[58] Field of Search .................... 363/39, 40, 44, 363/45, 46, 47

[56] References Cited

U.S. PATENT DOCUMENTS

| | | | |
|---|---|---|---|
| 4,195,334 | 3/1980 | Perry et al. ............................. | 363/44 |
| 5,132,894 | 7/1992 | Rozman et al. ........................ | 363/47 X |
| 5,416,687 | 5/1995 | Beasley ................................... | 363/44 |

FOREIGN PATENT DOCUMENTS

| | | |
|---|---|---|
| 42 19 214 | 12/1993 | Germany . |
| 295 10 986 U | 11/1995 | Germany . |
| 1411440 | 10/1975 | United Kingdom . |

OTHER PUBLICATIONS

S.S. Kelkar, F.C. Lee, "Adaptive Input Filter Compensation for Switching Regulators", IEEE Transactions on Aerospace and Electronic Systems, vol. AES–20, No. 1, pp. 57–66 (1984).

Johannes Nestler, "Glättungsfilter für Stromrichter", Wissenschaftliche Berichte Aeg Telefunken, Bd. 51, Nr. 1, pp. 58–63 (1978).

*Primary Examiner*—Y. J. Han
*Attorney, Agent, or Firm*—Kenyon & Kenyon

[57] ABSTRACT

In a circuit where a power converter (1) that is connected to a motor is also connected at its input terminals (2, 3) to a d.c. power supply system ($U_{DC}$) and where at least one condenser (C) is connected in parallel to the power converter (1) connected to the motor and at least one line reactor (L) is connected in series to the condenser (C), a reduction in the harmonic currents fed back into the d.c. power supply system ($U_{DC}$) by the power converter (1) connected to the motor above a predetermined minimum frequency is achieved without unnecessarily overdimensioning the condenser (C) and the line reactor (L) due to the fact that the line reactor (L) has at least one tapping point (4) to which at least one RC circuit (5) is connected in parallel to the condenser (C), where the RC circuit (5) has at least one capacitor ($C_1$) and at least one resistor ($R_1$) connected in series with it.

5 Claims, 1 Drawing Sheet

# ELECTRIC CIRCUIT FOR REDUCING HARMONIC CURRENTS

FIELD OF THE INVENTION

The present invention relates to a circuit for reducing harmonic currents that may be fed back to a d.c. power supply system from a power converter driving a motor.

BACKGROUND INFORMATION

Circuits for reducing harmonic currents that are fed back into a d.c. power supply system by a power converter connected to a motor typically include at least one condenser connected in parallel with the power converter, and at least one line reactor connected in series with the condenser. In one such circuit, the harmonic currents fed back into the d.c. power supply system are limited to the required limit levels by suitably dimensioning the condenser and the line reactor. When requirements are high, i.e., when only a small portion of the harmonic currents may be tolerably fed back into the d.c. power supply system, the condenser and the line reactor must be designed with very large dimensions.

British Patent No. 1,411,440 describes a circuit in which at least one LC series resonant circuit having at least one capacitor and at least one inductor is connected in parallel with the condenser. However, such a circuit can only reduce harmonic currents in a preselected frequency range. This circuit cannot reduce harmonic currents above a preselected minimum frequency. A reduction in harmonic currents above a defined minimum frequency could previously be achieved only by having the line reactor and the condenser overdimensioned. The parallel connection of an RC circuit with the intermediate circuit condenser which is possible with this circuit serves exclusively to increase the input impedance for 50 Hz currents.

In addition, German Patent Application No. 42 19 214 describes a circuit that attenuates harmonics and is connected between a power converter and an a.c. power supply system into which power is supplied. The system thus represents the load for the power converter. The circuit includes a duplex reactor which has a primary winding connected to the power converter and a secondary winding connected to the a.c. power supply system and in antiparallel connection to the primary winding. The harmonic component in the load current is reduced by the duplex reactor and an LC filter tuned to a predefined frequency and connected to a tapping point of the duplex reactor.

SUMMARY OF THE INVENTION

An object of the present invention is to provide a circuit that reduces harmonic currents, above a preselected frequency, that are fed back into a d.c. power supply system by a power converter which is connected to a motor. The present invention accomplishes this harmonic current reduction without unnecessarily overdimensioning the condenser and the reactor.

The circuit of the present invention includes a line reactor which has at least one tapping point at which at least one RC circuit is connected in parallel to the condenser. The RC circuit includes at least one capacitor and at least one resistor connected in series.

With the circuit according to the present invention, harmonics of the power converter connected to a motor can be greatly attenuated above a preselected minimum frequency. The condenser of the RC circuit connected in parallel to the condenser is to be tuned to this minimum frequency for this purpose. For the harmonic currents above this minimum frequency, the RC circuit connected in parallel to the condenser forms a low-impedance branch over which the harmonic currents flow.

In general, a single RC circuit is sufficient to accomplish the aforementioned object. Alternatively, it is also possible to connect a plurality of RC circuits in parallel with the condenser. Either all RC circuits can be led to a common tapping point or a separate tapping point on the line reactor can be provided for each RC circuit.

BRIEF DESCRIPTION OF THE DRAWING

The FIGURE shows a circuit in accordance with the present invention.

DETAILED DESCRIPTION

Figure 1:
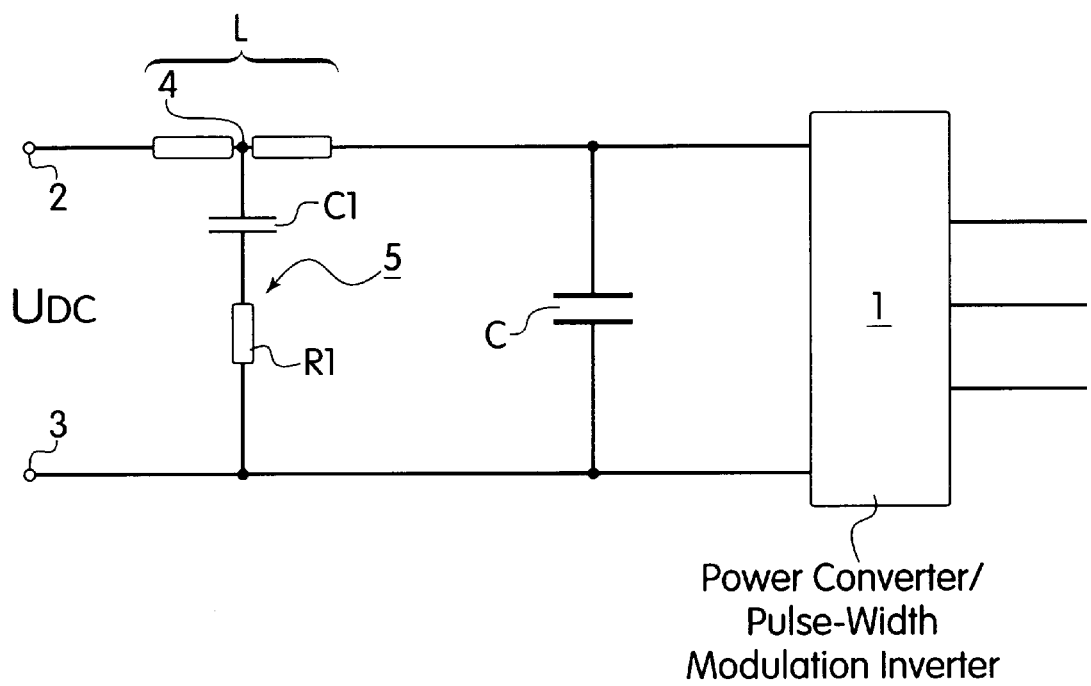

The FIGURE shows a circuit which includes a power converter 1 that is connected to a motor (not shown) and is preferably designed as a pulse-width-modulation inverter. Pulse-width-modulation inverter 1 is connected to a d.c. power supply system $U_{DC}$ via input terminals 2 and 3. A condenser C is connected in parallel to the pulse-width-modulation inverter 1. In addition, a line reactor L is connected in series with the condenser C.

According to the present invention, the line reactor L has a tapping point 4 which is arranged centrally in the embodiment illustrated. An RC circuit 5 is connected in parallel to condenser C at tapping point 4. RC circuit S comprises a capacitor $C_1$ and a resistor $R_1$ connected in series.

RC circuit 5 of the circuit according to the present invention is tuned to the minimum frequency of the harmonic currents to be attenuated, depending on the line reactor L. For the harmonic currents above this minimum frequency, RC circuit 5 thus forms a low-impedance branch by means of which the harmonic currents are short-circuited. The harmonic currents that are fed back into the d.c. power supply system UDC by the pulse-width-modulation inverter 1 are reduced according to this arrangement. Therefore, the condenser C and the line reactor L need not be overdimensioned.

What is claimed is:

1. A circuit for reducing harmonic oscillation currents fed back to a D.C. power supply system from a power converter, comprising:

a condenser coupled in parallel with an input of a power converter, the power converter being coupled to a motor;

an RC circuit including a capacitor and a resistor, wherein the resistor is coupled in series with the capacitor;

a line reactor connected in series with the condenser, wherein the line reactor includes at least one tapping point to which the RC circuit is connected in parallel with the condenser; and a circuit input coupled to an output of the D.C power supply system and coupled to the input of the power converter.

2. The circuit according to claim 1, wherein the tapping point is arranged centrally on the line reactor.

3. The circuit according to claim 1, wherein the power converter comprises a pulse-width modulation inverter.

4. The circuit according to claim 1, wherein the RC circuit is tuned to a minimum frequency of the harmonic oscillation currents.

5. The circuit according to claim 1, wherein the RC circuit reduces the harmonic oscillation currents to have a frequency which is above a predetermined frequency value.

* * * * *

UNITED STATES PATENT AND TRADEMARK OFFICE
CERTIFICATE OF CORRECTION

PATENT NO. : 6,011,705
DATED : January 4, 2000
INVENTOR(S) : Christian Duca and Marcus Weber Page 1 of 1

It is certified that error appears in the above-identified patent and that said Letters Patent is hereby corrected as shown below:

Column 2:
Line 27, change "S" to --5--

Column 2:
Line 36, change "UDC" to --$U_{DC}$--

Signed and Sealed this

Twelfth Day of June, 2001

*Attest:*

NICHOLAS P. GODICI
*Attesting Officer*    Acting Director of the United States Patent and Trademark Office